United States Patent

Takeuchi

[11] Patent Number: 6,146,452
[45] Date of Patent: *Nov. 14, 2000

[54] PSEUDOPLASTIC WATER BASED INK FOR BALLPOINT PEN

[75] Inventor: Yoji Takeuchi, Yokohama, Japan

[73] Assignee: Mitsubishi Pencil Kabushiki Kaisha, Tokyo, Japan

[*] Notice: This patent is subject to a terminal disclaimer.

[21] Appl. No.: 09/319,786

[22] PCT Filed: Dec. 8, 1997

[86] PCT No.: PCT/JP97/04479

§ 371 Date: Jun. 8, 1999

§ 102(e) Date: Jun. 8, 1999

[87] PCT Pub. No.: WO98/26015

PCT Pub. Date: Jun. 18, 1998

[30] Foreign Application Priority Data

Dec. 12, 1996 [JP] Japan ................................ 8-332489

[51] Int. Cl.$^7$ .................................................. C09D 11/00
[52] U.S. Cl. ..................... 106/31.58; 106/31.59; 106/31.86; 106/31.89
[58] Field of Search ............................ 106/31.58, 31.86, 106/31.59, 31.89

[56] References Cited

U.S. PATENT DOCUMENTS

| 5,683,500 | 11/1997 | Kawasumi et al. | 106/31.58 |
| 5,686,519 | 11/1997 | Loftin et al. | 524/462 |
| 5,990,201 | 11/1999 | Miyazaki et al. | 106/31.89 |

FOREIGN PATENT DOCUMENTS

| 56-95961 | 8/1981 | Japan . |
| 6-33006 | 2/1994 | Japan . |

*Primary Examiner*—C. Melissa Koslow
*Assistant Examiner*—Veronica F. Faison
*Attorney, Agent, or Firm*—Darby & Darby

[57] ABSTRACT

A pseudoplastic water based ink for a ballpoint pen comprising a thickner, a colorant, a dispersing agent, water and a polar solvent, wherein the ink includs sodium dialkyl sulfosuccinate in an amount of from 0.05 to 5% by weight based on the whole amount of ink, or sodium dialkyl sulfosuccinate in an amount of from 0.05 to 3% by weight and a fluorine base surfactant in an amount of from 0.01 to 2% by weight based on the whole amount of ink. The ink can be adoptable to a tip in any condition of the ball diameter, materials and dimensions.

2 Claims, No Drawings

PSEUDOPLASTIC WATER BASED INK FOR BALLPOINT PEN

TECHNICAL FIELD

The present invention relates to a water based ink for a ballpoint pen, more particularly, relates to a pseudoplastic water based ink for a ballpoint pen having the advantage of a ballpoint pen using an oil based ink.

BACKGROUND ART

In general, an ink for a ballpoint pen includes a water based ink for a ballpoint pen comprising water or water-soluble solvent and having a viscosity of as low as 10 mPa·s or less, and an oil based ink for a ballpoint pen comprising an oil based solvent such as a mineral oil, polyhydric alcohol, fatty acid and Cellosolve and having a viscosity of from 1000 to 20000 mPa·s.

A ballpoint pen using an oil based ink for a ballpoint pen has such structure that the ink adhered on a ball at the pen point through an ink reservoir having a small diameter is transferred onto a paper surface by the rotation of the ball, and the transferred amount of the ink is fed to the pen point through the reservoir.

A ballpoint pen using a water based ink for a ballpoint pen has such structure that an ink is fed to a ball surface and a paper surface by means of capillary action of a feed prepared by binding fine fibers.

The above described water based ink and oil based ink for a ballpoint pen each have excellent advantages, but also have various problems, respectively.

For example, since the water based ink for a ballpoint pen has low viscosity, the ink is fed by means of utilizing a principle of capillary action. That is to say, if the tip portion of the ballpoint pen and paper are simply brought into contact, the capillary action works at the contact point to feed the ink to the pen point. Therefore, favorable writing is made on the paper without applying so higher writing pressure, so that splitting, starving and blobbing are hardly caused. On the contrary, if the ink is directly filled in the ink reservoir, the ink tends to seep due to vibrations, impacts or a temperature rise of the open air, and the ink volume to be fed to the ball at the pen point becomes unstable. Therefore, the ballpoint pen requires complicated structure having a feed prepared by binding fine fibers. Moreover, there is another problem in that it is difficult to check the amount of the ink reserved in the ink reservoir.

On the other hand, since the oil based ink for a ballpoint pen has a high viscosity, it has such characteristics that blobbing of the ink from the pen point can be prevented, that the ink can be directly filled in the ink reservoir having a small diameter to simplify the structure of the ballpoint pen and that the remaining amount of the ink can be checked by using a transparent material for the ink reservoir. On the contrary, it has such disadvantages that since the ink is transferred only on the paper surface contacted with the rotating ball, if the rotation of the ball exhibits an unstable behavior, splitting and starving are easily caused and that since the ink hardly penetrates to the paper surface, blobbing which causes stain with the untransferred ink is easily caused.

To solve the above problems, recently, a water based ink for a ballpoint pen in which a gelling agent or a water-soluble paste is added to the water based ink to impart a special viscosity property (hereinafter referred to as a "pseudoplastic water based ink") has been widely known.

With regard to the ballpoint pen using this pseudoplastic water based ink, shear force is added to the ink due to the rotation of the ball at the point of the tip at the time of writing, so that the ink viscosity decreases so as to enable smooth writing as is the case with a ballpoint pen using water based ink and a favorable writing can be made on the paper surface. Moreover, when the pen is not used for writing, since the viscosity of the ink is high, blobbing of the ink from the pen point can be prevented, and the ink can be directly stored in the ink reservoir to simplify the structure of the ballpoint pen, and the remaining amount of the ink can be easily checked by using a transparent material for the ink reservoir. As described above, when a pseudoplastic water based ink for a ballpoint pen is used, a writing instrument which has both of characteristics of the ballpoint pen using a water based ink or the ballpoint pen using an oil based ink can be provided. When a pseudoplastic water based ink for a ballpoint pen is actually used, however, it is very difficult to maintain the intended quality of the pen, unless the viscosity of the ink is adjusted depending upon the used tip. For example, when an ink having a quality suitable for a tip for a small-diameter ball is used with a tip for a large-diameter ball, since the clearance between the ball and the holder varies and the shear speed imparted to the ink at the time of writing becomes small, blobbing and splitting may be caused, and there is another problem in that the dryness of lines is decreased due to the excessive flow of the ink.

It is an object of the present invention to solve the above mentioned problems and to provide a pseudoplastic water based ink for a ballpoint pen which can be adaptable to a tip in any condition of the ball diameter, materials, dimensions and the like, and which does not cause phenomena such as blobbing and splitting and can be fed in a stable amount for smooth writing at any time, and which has high stability with the lapse of time and high dryness of lines.

DISCLOSURE OF THE INVENTION

With a view to solving the above problems, we made researches to find that the object of the present invention can be attained by mixing a specific surfactant in a water based ink in a specific amount to eliminate such problems as blobbing, splitting and low dryness at the time of writing with a ballpoint pen filled with a pseudoplastic water based ink. Thus, the present invention has been completed.

The pseudoplastic water based ink for a ballpoint pen of the present invention is obtained by including 0.05 to 5% by weight of sodium dialkyl sulfosuccinate based on the whole amount of ink, into a pseudoplastic water based ink for a ballpoint pen comprising a thickner, a colorant, a dispersing agent, water and a polar solvent.

Moreover, the second pseudoplastic water based ink for a ballpoint pen of the present invention is obtained by including 0.05 to 3% by weight of sodium dialkyl sulfosuccinate and 0.01 to 2% by weight of a fluorine base surfactant based on the whole amount of ink, into the pseudoplastic water based ink for a ballpoint pen comprising a thickner, a colorant, a dispersing agent, water and a polar solvent.

The word "pseudoplastic" stands for a state that in a static state or when applied force is small (low shear force) the ink hardly flows and has a large apparent viscosity, and as the applied force increases (high shear force), the flowability largely increases and the viscosity drastically decreases.

BEST MODE FOR CARRYING OUT THE INVENTION

Sodium dialkyl sulfosuccinate used for the pseudoplastic water based ink for a ballpoint pen of the present invention is expressed by the following formula:

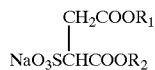

wherein $R_1$ and $R_2$ represent an alkyl group having 1 to 15 carbon atoms.

Specifically, there can be given sodium di-2-ethylhexyl sulfosuccinate and sodium dioctyl sulfosuccinate.

Sodium dialkyl sulfosuccinate imparts lubricity to the ink, and exhibits an effect of enhancing penetration of the ink to writing paper.

The fluorine base surfactant used for the pseudoplastic water based ink for a ballpoint pen of the present invention includes fluoroalkyl ($C_2$–$C_{10}$) carboxylic acid, N-perfluorooctanesulfonyl glutamic acid disodium salt, 3-[fluoroaklyl ($C_8$–$C_{11}$) oxy]-1-alkyl ($C_3$–$C_4$) sulfonic acid sodium salt, fluoroalkyl ($C_{11}$–$C_{20}$) carboxylic acid, perfluoroalkyl ($C_7$–$C_{13}$) carboxylic acid, monoperfluoroalkyl ($C_8$–$C_{16}$) ethyl phosphoric acid ester, perfluoroalkylamine oxide and perfluoroalkyl ethylene oxide adducts.

As a specific trade name, there can be exemplified EFTOP "EF-352" manufactured by Tochem Products.

The content of sodium dialkyl sulfosuccinate in the first pseudoplastic water based ink for a ballpoint pen of the present invention is 0.05 to 5% by weight based on the whole amount of ink. If the content is smaller than 0.05%, the penetration effect becomes small, and if the content is larger than 5%, feathering of the ink increases to make lines unclear.

The content of sodium dialkyl sulfosuccinate in the second pseudoplastic water based ink for a ballpoint pen of the present invention is 0.05 to 3% by weight based on the whole amount of ink. If the content is smaller than 0.05%, the penetration effect becomes small, and if the content is larger than 3%, feathering of the ink increases to make lines unclear. In addition, the content of the fluorine base surfactant is 0.01 to 2% by weight based on the whole amount of ink, and the fluorine base surfactant has such effects as reducing remarkably the surface tension of the ink and imparting lubricity to the ink. If the content of the fluorine base surfactant is smaller than 0.01%, these effects are not exerted, and if it is larger than 2% by weight, direct flow of the ink at the pen point and blobbing of the ink are easily caused.

Other components used in the water based ink for a ballpoint pen of the present invention shall now be described.

As a colorant, dyes and pigments which can be dissolved or dispersed in an aqueous solvent can be used, and concrete examples thereof include: acid dyes such as Eosine, Floxine, Water Yellow #6-C, Acid Red, Water Red, Water Blue #105, Brilliant Blue FCF and Nigrosine NB; direct dyes such as Direct Black 154, Direct Sky Blue 5B and Violet BB; basic dyes such as Rhodamine and Methyl Violet; inorganic pigments such as carbon black and ultramarine blue; and organic pigments such as Copper Phthalocyanine Blue and Benzidine Yellow. These may be used singly or in combination of two or more of them. The content of them is preferably from 0.1 to 30% by weight.

As a dispersing agent, there can be given polyethylene glycol, styrene-acrylic acid copolymer salts, styrene-maleic acid copolymer salts, and vinylnaphthalene-maleic acid copolymer salts.

Water can be used as a main solvent, and any solvent having a water-miscible polar group may be used. For example, there can be given ethylene glycol, diethylene glycol, triethylene glycol, polyethylene glycol, propylene glycol, ethylene glycol monomethyl ether, glycerin and pyrrolidone.

As a thickner, there can be given natural resins such as xanthane gum, guar gum and welan gum; synthetic polymers such as acrylic base polymers, urethan base polymers and crosslinking acrylic acid polymers; and inorganic substances such as smectite and montmorillonite.

As specific examples of synthetic polymers such as crosslinking acrylic acid polymers, there can be given "Junron PW-110", "Junron PW-111", "Hiviswako 103", "Hiviswako 104", "Hiviswako 105" and "Hiviswako 304" manufactured by Wako Pure Chemical Industries, Ltd.; "Carbopole 941" manufactured by BF Goodrich Company; and "Primal ASE-60", "Primal ASE-75", "Primal TT-615", "Primal TT-935" and "Primal GS" manufactured by Rohm & Haas Japan K.K.

As an adjusting agent, in addition to the above described components, there may be used, if necessary, benzotriazole and saponins as a rust preventive, potassium hydroxide, potassium phosphate and triethanol amine as a pH adjusting agent, and sodium omadine and 1,2-benzisothiazoline as an antiseptic agent.

As the production process of the pseudoplastic water based ink for a ballpoint pen of the present invention, it can be easily obtained by dissolving with heating and mixing/stirring the above described components according to necessity.

The pseudoplastic water based ink for a ballpoint pen of the present invention is obtained by incorporating as a surfactant sodium dialkyl sulfosuccinate, or a fluorine base surfactant and sodium dialkyl sulfosuccinate, which are different from the conventional surfactants. Hence, when it is used for a ballpoint pen, phenomena such as blobbing and splitting are not caused, irrespective of the ball diameter, materials and dimensions of the tip, and it can be fed in a stable amount for smooth writing at any time besides exhibiting excellent stability with time and dryness of lines.

This is because the ink containing a fluorine base surfactant markedly reduces in surface tension, and dialkyl sodium sulfosuccinate has an ability of reducing solid-liquid interfacial tension and surface tension of the ink. The ink having such properties improves wettability for the tip, when used for a ballpoint pen. Hence, even if any size of a ball is used (that is, even if the shear force applied to the ink changes), the ink can flow uninteruptedly to enable stable writing. Moreover, the ink has low interfacial tension to a paper surface and a sufficient penetration effect, hence it is inferred that the dryness of lines is high and occurrence of blobbing and splitting can be prevented.

EXAMPLES

The present invention shall now be specifically explained with reference to examples, but the present invention shall be by no means limited by these examples.

Ink compositions obtained in Examples and Comparative Examples were subjected to the following tests. The results are shown in Table 1 and Table 2.

Viscosity:

The viscosity was measured at shear speeds of 3.84 $s^{-1}$ and 384 $s^{-1}$ by means of an E-type rotational viscometer.

Smoothness of writing:

A ballpoint pen was used for writing by means of a write test machine and the flow state of the ink was evaluated according to the following criteria:
○ The pen can write smoothly.
Δ The pen scratches slightly.
X Starving is seen.
Blobbing preventing property:

After writing at a speed of 4.5 m/min. at an angle of 60° and under a load of 100 g by means of a write test machine, the amount of ink adhered to the tip holder and excessive ink marks dropped on the lines were observed and evaluated according to the following criteria:
○ There is little blobbing.
Δ Blobbing is seen slightly.
X There are lots of blobbing.
Splitting preventing property:

After writing with a ballpoint pen using a write test machine, the state of the lines was evaluated according to the following criteria:
○ Excellent, having no splitting.
Δ A Splitting is slightly seen.
X Splitting is remarkable.
Fast writing property:

When writing was performed at a speed of twice the normal speed, the followability of the ink composition was evaluated according to the following criteria:
○ Fine lines can be written without starving.
Δ Starving is slightly seen.
X Starving is remarkable.
Dryness of line:

A spiral line was written on writing paper in a room of a constant temperature of 25° C. at humidity of 65%, and after 10 seconds, it was rubbed with a commercially available cotton swab, and stains due to the ink were observed and evaluated according to the following criteria:
○ No stain is observed.
Δ The cotton swab is slightly stained.
X The cotton swab is stained.

Example 1

A blue pseudoplastic water based pigment ink for a ballpoint pen was prepared according to the following formula:

| | |
|---|---|
| Phthalocyanine Blue | 8.0% by weight |
| Styrene-acrylic resin ammonium salt | 3.0% by weight |
| Sodium dioctyl sulfosuccinate | 1.0% by weight |
| ("Pelex OTP" manufactured by Kao Corporation) | |
| Ethylene glycol | 20.0% by weight |
| Aminomethyl propanol | 0.3% by weight |
| Benzotriazole | 0.2% by weight |
| Thickner | 0.4% by weight |
| (Acrylic base synthetic polymer) | |
| Ion-exchanged water | the rest |

Example 2

A black pseudoplastic water based pigment ink for a ballpoint pen was prepared according to the following formula:

| | |
|---|---|
| Carbon black | 8.0% by weight |
| Styrene-acrylic resin ammonium salt | 3.0% by weight |
| Sodium dioctyl sulfosuccinate | 1.5% by weight |
| ("Pelex TR" manufactured by Kao Corporation) | |
| Ethylene glycol | 20.0% by weight |
| Aminomethyl propanol | 0.3% by weight |
| Benzotriazole | 0.2% by weight |
| Thickner | 0.4% by weight |
| (Crosslinking acrylic acid polymer) | |
| Ion-exchanged water | the rest |

Example 3

A blue pseudoplastic water based pigment ink for a ballpoint pen was prepared according to the following formula:

| | |
|---|---|
| Phthalocyanine Blue | 8.0% by weight |
| Styrene-acrylic resin ammonium salt | 3.0% by weight |
| Fluorine base surfactant | 0.1% by weight |
| (perfluoroalkyl carboxylic acid salt: "Serfluon S-111" manufactured by Asahi Glass Company) | |
| Sodium dioctyl sulfosuccinate | 0.5% by weight |
| ("Pelex OTP" manufactured by Kao Corporation) | |
| Ethylene glycol | 20.0% by weight |
| Aminomethyl propanol | 0.3% by weight |
| Benzotriazole | 0.2% by weight |
| Thickner | 0.4% by weight |
| (Acrylic base synthetic polymer) | |
| Ion-exchanged water | the rest |

Example 4

A black pseudoplastic water based pigment ink for a ballpoint pen was prepared according to the following formula:

| | |
|---|---|
| Carbon black | 8.0% by weight |
| Styrene-acrylic resin ammonium salt | 3.0% by weight |
| Fluorine base surfactant | 0.5% by weight |
| (perfluoroalkyl carboxylic acid salt: "EF-352" manufactured by Tochem Products) | |
| Sodium dioctyl sulfosuccinate | 1.0% by weight |
| ("Pelex TR" manufactured by Kao Corporation) | |
| Ethylene glycol | 20.0% by weight |
| Aminomethyl propanol | 0.3% by weight |
| Benzotriazole | 0.2% by weight |
| Thickner | 0.4% by weight |
| (Crosslinking acrylic polymer) | |
| Ion-exchanged water | the rest |

Comparative Example 1

A blue pseudoplastic water based pigment ink for a ballpoint pen was prepared in the same manner as in Example 1, except that 0.8% by weight of phosphoric acid ester ("Phosphanol RS-610" manufactured by Toho Chemical industry Co., Ltd.) was added instead of sodium dioctyl sulfosuccinate.

Comparative Example 2

A black pseudoplastic water based pigment ink for a ballpoint pen was prepared in the same manner as in Example 2, except that 0.8% by weight of phosphoric acid ester ("Phosphanol RS-610" manufactured by Toho Chemical Industry Co., Ltd.) was added instead of sodium dioctyl sulfosuccinate.

Comparative Example 3

A blue pseudoplastic water based pigment ink for a ballpoint pen was prepared in the same manner as in Example 3, except that 0.6% by weight of potash soap was added instead of using the fluorine base surfactant and sodium dioctyl sulfosuccinate.

Comparative Example 4

A black pseudoplastic water based pigment ink for a ballpoint pen was prepared in the same manner as in Example 4, except that 0.6% by weight of potash soap was added instead of using the fluorine base surfactant and sodium dioctyl sulfosuccinate.

Inks obtained by the formulas of Examples 1 to 4 and inks obtained by the formulas of Comparative Examples 1 to 4 were filled in a ballpoint pen body having a ball diameter of 0.5 mm and a ballpoint pen body having a ball diameter of 1.0 mm, respectively, to compare the quality of the ink. The results are shown in Table 1 and Table 2.

TABLE 1

| | Shear speed | Examples | | | | Comparative Examples | | | |
|---|---|---|---|---|---|---|---|---|---|
| | ($s^{-1}$) | 1 | 2 | 3 | 4 | 1 | 2 | 3 | 4 |
| Ink viscosity mPa·s | 3.84 | 220 | 400 | 250 | 450 | 600 | 750 | 740 | 800 |
| | 384 | 50 | 80 | 60 | 80 | 55 | 65 | 50 | 60 |

TABLE 2

| | | Examples | | | | Comparative Examples | | | |
|---|---|---|---|---|---|---|---|---|---|
| | | 1 | 2 | 3 | 4 | 1 | 2 | 3 | 4 |
| A ball having 0.5 mm⌀ | Smoothness of writing | ○ | ○ | ○ | ○ | ○ | ○ | Δ | Δ |
| | Blobbing preventing property | ○ | ○ | ○ | ○ | ○ | ○ | ○ | ○ |
| | Splitting prevention | ○ | ○ | ○ | ○ | ○ | ○ | ○ | ○ |
| | Fast writing property | ○ | ○ | ○ | ○ | ○ | ○ | ○ | ○ |
| | Dryness of line | ○ | ○ | ○ | ○ | ○ | ○ | ○ | ○ |
| A ball having 1.0 mm⌀ | Smoothness of writing | ○ | ○ | ○ | ○ | ○ | ○ | ○ | ○ |
| | Blobbing preventing property | ○ | ○ | ○ | ○ | Δ | Δ | Δ | Δ |
| | Splitting privention | ○ | ○ | ○ | ○ | Δ | Δ | Δ | Δ |
| | Fast writing property | ○ | ○ | ○ | ○ | Δ | Δ | Δ | Δ |
| | Dryness of line | ○ | ○ | ○ | ○ | X | X | X | X |

Industrial Applicability

The pseudoplastic water based ink for a ballpoint pen of the present invention does not cause phenomena such as blobbing and splitting, when used for a ballpoint pen, irrespective of the ball diameter and materials and dimensions of the ball, and it can be fed in a stable amount for smooth writing at any time besides exhibiting excellent stability with time and dryness of lines. Hence, the ink can be preferably used for an a ballpoint pen using a water based ink, regardless of the ball diameter of the tip.

What is claimed is:

1. A pseudoplastic water based ink for a ballpoint pen comprising a thickener, a colorant, a dispersing agent, water and a polar solvent, wherein the ink includes sodium dialkyl sulfosuccinate in an amount of from 0.05 to 5% by weight based on the whole amount of ink.

2. A pseudoplastic water based ink for a ballpoint pen comprising a thickener, a colorant, a dispersing agent, water and a polar solvent, wherein the ink includes sodium dialkyl sulfosuccinate in an amount of from 0.05 to 3% by weight and a fluorine base surfactant in an amount of from 0.01 to 2% by weight based on the whole amount of ink.

* * * * *